Patented July 10, 1951

2,560,522

UNITED STATES PATENT OFFICE 2,560,522

1-BENZHYDRYL-3-ACYLUREAS AND PROCESS FOR PRODUCING SAME

Robert Duschinsky, Essex Fells, N. J., assignor to Hoffmann-La Roche Inc., Nutley, N. J., a corporation of New Jersey No Drawing. Application July 12, 1949, Serial No. 104,394

9 Claims. (Cl. 260—553)

The present invention relates to 1-benzhydryl-3-acylureas and to methods for producing the same. The compounds of the invention can, in general, be represented by the following formula:

Ph₂CH—NHCONH—acyl

In the above formula, Ph stands for a phenyl radical, acyl stands for an acyl radical, such as a lower aliphatic acyl radical, as for example, formyl, acetyl, propionyl, butyryl, chloroacetyl, or an aromatic acyl radical, as for example, benzoyl.

Compounds of the instant invention possess useful medicinal properties, for example, as analgesics, hypnotics, sedatives and anticonvulsants.

In general, the new compounds can be prepared by reacting benzhydrylurea with a carboxylic acid halide, as for example, a carboxylic acid chloride, preferably in the presence of an acid binding agent, such as pyridine. Instead of a carboxylic acid chloride, the carboxylic acid anhydride or the carboxylic acid in the presence of an anhydride can be employed to acylate the benzhydrylurea. The 1-benzhydryl-3-acylureas can also be prepared by reacting benzhydrol with monoacylated urea of the formula H₂NCONH—acyl, acyl having the same significance already assigned thereto, preferably in the presence of a condensing agent such as sulfuric acid.

The following examples will serve to illustrate the invention:

EXAMPLE 1

1-benzhydryl-3-formylurea

A mixture of 20 grams of benzhydrylurea, 100 cc. of 97.5% formic acid and 9 cc. of acetic anhydride was refluxed for one hour. The reaction mixture was evaporated to dryness and the residue was again refluxed with the same quantities of formic acid and acetic anhydride. The residue obtained, after evaporation of the refluxed mixture, was dissolved in 75 cc. of boiling xylene. On cooling, the solution yielded crystals of 1-benzhydryl-3-formylurea, melting at approximately 180° C. Four recrystallizations, carried out by dissolving the compound in boiling ethanol and then cooling the solution with Dry Ice, yielded 1-benzhydryl-3-formylurea melting at 190–191° C.

EXAMPLE 2

1-benzhydryl-3-acetylurea

A. To a solution of 150 grams of benzhydrylurea in 450 cc. of pyridine cooled in an ice bath, 84 cc. of acetyl chloride were gradually added with stirring. After removing the ice bath, the temperature of the mixture rose spontaneously to 90° C. The reaction was completed by refluxing for 30 minutes. Upon cooling and on addition of 300 cc. of ethanol, followed by 2000 cc. of water, the 1-benzhydryl-3-acetylurea crystallized. The crude yellowish crystallized product was washed with Dry Ice-cooled ethanol and while still moist was recrystallized by dissolving it in 600 cc. of boiling ethanol, filtering the solution through charcoal and adding 1500 cc. of water to the filtrate. After washing with Dry Ice-cooled ethanol and drying, the compound melted at 151–153° C. Two recrystallizations from ethanol raised the melting point of the compound to 154–155° C.

B. To a mixture of 7.4 grams of benzhydrol, 4 grams of acetylurea, 50 cc. of acetic acid and 5 cc. of acetic anhydride was added a mixture of 5 cc. of acetic acid and 0.5 cc. of 97% sulfuric acid. Heat was evolved spontaneously and the reaction was completed by refluxing for ten minutes. The reaction mixture was poured into 1000 cc. of water, whereupon 1-benzhydryl-3-acetylurea crystallized. It was filtered and washed with Dry Ice-cooled ethanol. Upon recrystallization of the compound from 35 cc. of ethanol, it melted at 153–155° C. The compound is identical with the 1-benzhydryl-3-acetylurea obtained under procedure A.

EXAMPLE 3

1-benzhydryl-3-propionylurea

A mixture of 5 grams of benzhydrylurea, 15 cc. of pyridine and 2.55 grams of propionylchloride was refluxed for 45 minutes. After cooling the reaction mixture, 10 cc. of ethanol and 20 cc. of water were added. Crystalline 1-benzhydryl-3-propionylurea was formed and filtered from the mother liquor. After recrystallization from 10 cc. of ethanol, the compound melted at 130–131° C.

EXAMPLE 4

1-benzhydryl-3-butyrylurea

To a mixture of 7.1 grams of benzhydrol, 5 grams of butyrylurea, 38.5 cc. of acetic acid and 4.8 cc. of acetic anhydride there was added a mixture of 4.4 cc. of acetic acid and 0.4 cc. of 97% sulfuric acid. Heat was evolved spontaneously and the reaction was completed by refluxing for 20 minutes. The reaction mixture was poured into 200 cc. of water, filtered and washed with Dry Ice-cooled methanol, yielding crude 1-benzhydryl-3-butyrylurea which after two recrystallizations from methanol melted at 135–136° C.

EXAMPLE 5

1-benzhydryl-3-benzoylurea

To a cooled solution of 11.3 grams of benzhydrylurea in 30 cc. of pyridine there was added gradually with stirring 7.7 grams of benzoyl chloride. After refluxing for 30 minutes, 15 cc. of ethanol and 150 cc. of water were added. The 1-benzhydryl-3-benzoylurea which formed, separated and was filtered from the reaction mixture. It was washed with a 5% sodium carbonate solution, water and ethanol, and then recrystallized from 150 cc. of xylene. After further washing with ethanol and drying, crystals melting at 202–203° C. were obtained. After a second recrystallization from xylene and a further crystallization from ethanol the compound melted at 208–210° C.

EXAMPLE 6

1-benzhydryl-3-chloracetylurea

A mixture of 1.7 grams of benzhydrylurea and 0.6 cc. of chloroacetylchloride was heated on an oil bath to 100–120° C. for 15 minutes. A clear liquid first formed which then solidified. The solidified product was cooled and washed with 20 cc. of water, then dissolved in 3.5 cc. of methanol and crystallized by cooling with Dry Ice. The crystalline product was dissolved in hot xylene. The xylene solution was then cooled to room temperature and filtered from a small amount of solid material that precipitated as a by-product. Upon standing for 16 hours and partial evaporation of the xylene, 1-benzhydryl-3-chloroacetylurea crystallized from the filtrate. After recrystallization from methanol the 1-benzhydryl-3-chloroacetylurea melted at 120–121° C.

I claim:

1. A 1-benzhydryl-3-acylurea of the group consisting of 1-benzhydryl-3-formylurea, 1-benzhydryl-3-acetylurea, 1-benzhydryl - 3 - propionylurea, 1-benzhydryl-3-butyrylurea, 1-benzhydryl-3-chloracetylurea and 1-benzhydryl-3-benzoylurea.
2. 1-benzhydryl-3-formylurea.
3. 1-benzhydryl-3-acetylurea.
4. 1-benzhydryl-3-propionylurea.
5. A process which comprises reacting benzhydrol with acetylurea in the presence of acetic anhydride and sulfuric acid so as to produce 1-benzhydryl-3-acetylurea.
6. 1-benzhydryl-3-lower alkanoic acid acyl urea.
7. A process which comprises reacting benzhydrol with mono-lower alkanoic acid acyl urea to form the corresponding 1-benzhydryl-3-lower alkanoic acid acyl urea.
8. The process as in claim 7, wherein the reaction is carried out in the presence of an acid condensing agent.
9. The process as in claim 8, wherein the condensing agent is sulfuric acid.

ROBERT DUSCHINSKY.

No references cited.